(12) United States Patent
Ganesan

(10) Patent No.: US 9,176,955 B2
(45) Date of Patent: Nov. 3, 2015

(54) METHOD AND APPARATUS FOR SHARING MEDIA FILES AMONG NETWORK NODES

(75) Inventor: Prasanna Ganesan, Menlo Park, CA (US)

(73) Assignee: VVOND, INC., Redwood City, CA (US)

( * ) Notice: Subject to any disclaimer, the term of this patent is extended or adjusted under 35 U.S.C. 154(b) by 2256 days.

(21) Appl. No.: 11/278,416

(22) Filed: Apr. 1, 2006

(65) Prior Publication Data

US 2009/0025048 A1    Jan. 22, 2009

Related U.S. Application Data

(63) Continuation-in-part of application No. 11/075,573, filed on Mar. 9, 2005.

(51) Int. Cl.
*G06F 17/30* (2006.01)
*H04N 7/16* (2011.01)
*H04N 7/173* (2011.01)
*H04N 21/2312* (2011.01)
(Continued)

(52) U.S. Cl.
CPC ...... *G06F 17/30017* (2013.01); *H04L 65/4084* (2013.01); *H04L 67/06* (2013.01); *H04L 67/2852* (2013.01); *H04N 7/163* (2013.01); *H04N 7/17318* (2013.01); *H04N 21/2312* (2013.01); *H04N 21/2323* (2013.01); *H04N 21/4335* (2013.01); *H04N 21/44245* (2013.01); *H04N 21/4622* (2013.01); *H04N 21/47202* (2013.01); *H04N 21/632* (2013.01); *H04N 21/8456* (2013.01); *H04L 41/509* (2013.01); *H04L 67/289* (2013.01); *H04L 67/32* (2013.01); *H04N 21/00* (2013.01)

(58) Field of Classification Search
USPC .......................................................... 709/201
See application file for complete search history.

(56) References Cited

U.S. PATENT DOCUMENTS 5,132,992 A    7/1992  Yurt et al.
5,414,455 A    5/1995  Hooper et al.
(Continued)

FOREIGN PATENT DOCUMENTS

WO    WO 97/16023    5/1997
WO    WO 01/24526    4/2001
WO    WO 03/041383   5/2003

OTHER PUBLICATIONS

U.S. Appl. No. 11/150,653, filed Jun. 11, 2005, Ganesan et al.
(Continued)

*Primary Examiner* — Tom Y Chang
(74) *Attorney, Agent, or Firm* — Bryan Cave LLP

(57) ABSTRACT

Techniques for sharing data among a plurality of networked devices, also referred to network nodes, are discussed. To best use an available uploading bandwidth of a device sharing data with a receiving device, a portion of the data is uploaded within the available uploading bandwidth, and another portion of the data is uploaded from another device locally caching the same data. To satisfy the minimum transmission rate of the data to the receiving device, both portions of the data are concurrently uploaded from the two devices to the receiving device. In reference to a predetermined minimum uploading bandwidth and the available uploading bandwidth, the two portions of data are interleaved and must be reassembled to recover the data for consumption in the receiving device. A size of the first portion of the data is determined by a server in view of the available uploading bandwidth a designated supplying box has.

19 Claims, 7 Drawing Sheets

(51) Int. Cl.
  *H04N 21/232* (2011.01)
  *H04N 21/4335* (2011.01)
  *H04N 21/442* (2011.01)
  *H04N 21/462* (2011.01)
  *H04N 21/472* (2011.01)
  *H04N 21/63* (2011.01)
  *H04N 21/845* (2011.01)
  *H04L 29/06* (2006.01)
  *H04L 29/08* (2006.01)
  *H04L 12/24* (2006.01)
  *H04N 21/00* (2011.01)

(56) References Cited

U.S. PATENT DOCUMENTS

| | | |
|---|---|---|
| 5,602,918 A | 2/1997 | Chen et al. |
| RE35,651 E | 11/1997 | Bradley et al. |
| 5,694,559 A | 12/1997 | Hobson et al. |
| 5,701,582 A | 12/1997 | DeBey |
| 5,721,878 A | 2/1998 | Ottesen et al. |
| 5,729,280 A | 3/1998 | Inoue et al. |
| 5,761,417 A | 6/1998 | Henley et al. |
| 5,765,164 A | 6/1998 | Prasad et al. |
| 5,802,283 A | 9/1998 | Grady et al. |
| 5,815,146 A | 9/1998 | Youden et al. |
| 5,815,662 A | 9/1998 | Ong |
| 5,826,168 A | 10/1998 | Inoue et al. |
| 5,831,662 A | 11/1998 | Payton |
| 5,838,314 A | 11/1998 | Neel et al. |
| 5,877,812 A | 3/1999 | Krause et al. |
| 5,884,031 A | 3/1999 | Ice |
| 5,903,563 A | 5/1999 | Rashid et al. |
| 5,926,205 A | 7/1999 | Krause et al. |
| 5,928,331 A | 7/1999 | Bushmitch |
| 5,933,603 A | 8/1999 | Vahalia et al. |
| 5,948,070 A | 9/1999 | Fujita |
| 6,018,359 A | 1/2000 | Kermode et al. |
| 6,037,983 A * | 3/2000 | Au et al. ............ 348/399.1 |
| 6,038,560 A | 3/2000 | Wical |
| 6,055,314 A | 4/2000 | Spies et al. |
| 6,124,854 A | 9/2000 | Sartain et al. |
| 6,138,221 A | 10/2000 | Korst et al. |
| 6,170,006 B1 | 1/2001 | Namba |
| 6,184,878 B1 | 2/2001 | Alonso et al. |
| 6,212,549 B1 | 4/2001 | Page et al. |
| 6,236,504 B1 | 5/2001 | Kao et al. |
| 6,263,504 B1 | 7/2001 | Ebisawa |
| 6,324,519 B1 | 11/2001 | Eldering |
| 6,334,124 B1 | 12/2001 | Bouchard et al. |
| 6,397,251 B1 | 5/2002 | Graf |
| 6,463,508 B1 | 10/2002 | Wolf et al. |
| 6,502,139 B1 | 12/2002 | Birk et al. |
| 6,519,693 B1 | 2/2003 | Debey |
| 6,614,366 B2 | 9/2003 | Luby |
| 6,622,305 B1 | 9/2003 | Willard |
| 6,630,963 B1 | 10/2003 | Billmaier |
| 6,640,241 B1 | 10/2003 | Ozzie et al. |
| 6,701,528 B1 | 3/2004 | Arsenault et al. |
| 6,704,813 B2 | 3/2004 | Smirnov et al. |
| 6,728,763 B1 | 4/2004 | Chen |
| 6,731,605 B1 | 5/2004 | Deshpande |
| 6,763,392 B1 * | 7/2004 | del Val et al. ............ 709/231 |
| 6,789,106 B2 | 9/2004 | Eyer et al. |
| 6,801,947 B1 | 10/2004 | Li |
| 6,804,719 B1 | 10/2004 | Cabrera |
| 6,857,012 B2 | 2/2005 | Sim et al. |
| 6,934,965 B2 | 8/2005 | Gordon et al. |
| 6,938,258 B1 | 8/2005 | Weinberger et al. |
| 6,944,585 B1 | 9/2005 | Pawson |
| 6,970,937 B1 | 11/2005 | Huntington |
| 6,973,667 B2 | 12/2005 | Fritsch |
| 7,051,360 B1 | 5/2006 | Ellis et al. |
| 7,080,400 B1 | 7/2006 | Navar |
| 7,110,006 B2 | 9/2006 | MacInnis et al. |
| 7,155,735 B1 | 12/2006 | Ngo et al. |
| 7,174,385 B2 | 2/2007 | Li |
| 7,188,357 B1 | 3/2007 | Rieschl et al. |
| 7,191,215 B2 | 3/2007 | Ganesan et al. |
| 7,228,556 B2 | 6/2007 | Beach et al. |
| 7,240,359 B1 | 7/2007 | Sie et al. |
| 7,246,369 B1 | 7/2007 | Duan et al. |
| 7,260,829 B1 | 8/2007 | Hendricks et al. |
| 7,324,555 B1 | 1/2008 | Chen et al. |
| 7,360,235 B2 | 4/2008 | Davies et al. |
| 7,379,963 B1 | 5/2008 | Khare et al. |
| 7,386,874 B2 | 6/2008 | White et al. |
| 7,552,382 B1 | 6/2009 | Munetsugu et al. |
| 7,577,750 B2 | 8/2009 | Shen et al. |
| 7,633,887 B2 | 12/2009 | Panwar et al. |
| 7,698,451 B2 | 4/2010 | Ganesan |
| 7,810,647 B2 | 10/2010 | Ganesan et al. |
| 2001/0019630 A1 | 9/2001 | Johnson |
| 2001/0042249 A1 | 11/2001 | Knepper et al. |
| 2001/0051998 A1 | 12/2001 | Henderson |
| 2002/0012521 A1 | 1/2002 | Nagasaka et al. |
| 2002/0022956 A1 | 2/2002 | Ukrainczyk |
| 2002/0029282 A1 | 3/2002 | Buddhikot et al. |
| 2002/0031331 A1 | 3/2002 | Kwoh et al. |
| 2002/0053078 A1 * | 5/2002 | Holtz et al. ............ 725/14 |
| 2002/0091825 A1 | 7/2002 | Shuster |
| 2002/0129375 A1 | 9/2002 | Kim et al. |
| 2002/0131423 A1 | 9/2002 | Chan et al. |
| 2002/0133491 A1 * | 9/2002 | Sim et al. ............ 707/10 |
| 2002/0143959 A1 | 10/2002 | El-Baze et al. |
| 2002/0154703 A1 | 10/2002 | Kubota et al. |
| 2002/0154892 A1 | 10/2002 | Hoshen et al. |
| 2002/0162109 A1 | 10/2002 | Shteyn |
| 2002/0163882 A1 | 11/2002 | Bornstein et al. |
| 2003/0021244 A1 * | 1/2003 | Anderson ............ 370/329 |
| 2003/0026254 A1 | 2/2003 | Sim |
| 2003/0028490 A1 | 2/2003 | Miura et al. |
| 2003/0055893 A1 | 3/2003 | Sato et al. |
| 2003/0078964 A1 * | 4/2003 | Parrella et al. ............ 709/203 |
| 2003/0084461 A1 | 5/2003 | Hoang |
| 2003/0097661 A1 | 5/2003 | Li et al. |
| 2003/0126277 A1 | 7/2003 | Son et al. |
| 2003/0135867 A1 | 7/2003 | Guedalia |
| 2003/0163646 A1 | 8/2003 | O'Neil |
| 2003/0188316 A1 | 10/2003 | DePrez |
| 2003/0188317 A1 | 10/2003 | Liew et al. |
| 2003/0204613 A1 | 10/2003 | Hudson et al. |
| 2003/0204856 A1 | 10/2003 | Buxton |
| 2003/0208612 A1 | 11/2003 | Harris et al. |
| 2004/0016000 A1 | 1/2004 | Zhang et al. |
| 2004/0078460 A1 * | 4/2004 | Valavi et al. ............ 709/224 |
| 2004/0107242 A1 | 6/2004 | Vert et al. |
| 2004/0123324 A1 | 6/2004 | Sazzad et al. |
| 2004/0128343 A1 | 7/2004 | Mayer |
| 2004/0133923 A1 | 7/2004 | Watson et al. |
| 2004/0143672 A1 | 7/2004 | Padmanabham et al. |
| 2004/0143850 A1 | 7/2004 | Costa |
| 2004/0148634 A1 | 7/2004 | Arsenault et al. |
| 2004/0148636 A1 | 7/2004 | Weinstein et al. |
| 2004/0158867 A1 | 8/2004 | Mack et al. |
| 2004/0202073 A1 | 10/2004 | Lai et al. |
| 2004/0236869 A1 | 11/2004 | Moon |
| 2004/0250286 A1 | 12/2004 | Fraser et al. |
| 2004/0255323 A1 | 12/2004 | Varadarajan et al. |
| 2004/0267822 A1 | 12/2004 | Curran et al. |
| 2005/0010653 A1 | 1/2005 | McCanne |
| 2005/0015511 A1 | 1/2005 | Izmailov et al. |
| 2005/0033856 A1 | 2/2005 | Li |
| 2005/0038724 A1 | 2/2005 | Roever et al. |
| 2005/0041679 A1 | 2/2005 | Weinstein et al. |
| 2005/0055425 A1 | 3/2005 | Lango et al. |
| 2005/0055718 A1 | 3/2005 | Stone |
| 2005/0066063 A1 | 3/2005 | Grigorovitch et al. |
| 2005/0086696 A1 | 4/2005 | Daniels |
| 2005/0097213 A1 | 5/2005 | Barrett et al. |
| 2005/0108414 A1 | 5/2005 | Taylor et al. |
| 2005/0177853 A1 | 8/2005 | Williams et al. |
| 2005/0216941 A1 | 9/2005 | Flanagan et al. |
| 2005/0259682 A1 | 11/2005 | Yosef et al. |

(56) References Cited

U.S. PATENT DOCUMENTS

| | | | |
|---|---|---|---|
| 2005/0267948 A1 | 12/2005 | McKinley et al. |
| 2006/0008256 A1 | 1/2006 | Khedouri et al. |
| 2006/0026663 A1 | 2/2006 | Kortum et al. |
| 2006/0031537 A1 | 2/2006 | Boutboul et al. |
| 2006/0034537 A1 | 2/2006 | Masaki |
| 2006/0037037 A1 | 2/2006 | Miranz |
| 2006/0075453 A1 | 4/2006 | Choi |
| 2006/0095948 A1 | 5/2006 | Verhaegh et al. |
| 2006/0106807 A1* | 5/2006 | DeVitis et al. ............... 707/10 |
| 2006/0136597 A1 | 6/2006 | Shabtai et al. |
| 2006/0174160 A1 | 8/2006 | Kim |
| 2006/0184688 A1 | 8/2006 | Ganguly et al. |
| 2006/0190615 A1 | 8/2006 | Panwar et al. |
| 2006/0190975 A1 | 8/2006 | Gonzalez |
| 2006/0206889 A1 | 9/2006 | Ganesan et al. |
| 2006/0218217 A1 | 9/2006 | Ganesan et al. |
| 2006/0242153 A1* | 10/2006 | Newberry et al. ............... 707/10 |
| 2007/0089146 A1 | 4/2007 | Ikeda et al. |
| 2007/0143804 A1 | 6/2007 | Wang |
| 2008/0022343 A1 | 1/2008 | Hodzic et al. |
| 2008/0091840 A1 | 4/2008 | Guo et al. |
| 2008/0134258 A1 | 6/2008 | Goose et al. |
| 2008/0148323 A1 | 6/2008 | White et al. |
| 2008/0212945 A1 | 9/2008 | Khedouri et al. |
| 2008/0256272 A1 | 10/2008 | Kampmann et al. |
| 2008/0281913 A1 | 11/2008 | Shankar et al. |
| 2008/0282036 A1 | 11/2008 | Ganesan |
| 2008/0282298 A1 | 11/2008 | Ganesan et al. |
| 2008/0301738 A1 | 12/2008 | Davies et al. |
| 2009/0007196 A1 | 1/2009 | Ganesan |
| 2009/0019174 A1 | 1/2009 | Ehn et al. |
| 2009/0019468 A1 | 1/2009 | Ganesan et al. |
| 2009/0024573 A1 | 1/2009 | Zink |
| 2009/0025046 A1 | 1/2009 | Ganesan et al. |
| 2010/0049867 A1 | 2/2010 | Panwar et al. |
| 2010/0223362 A1 | 9/2010 | Price |
| 2010/0254675 A1 | 10/2010 | Ganesan |
| 2011/0023072 A1 | 1/2011 | Hodzic et al. |
| 2011/0093492 A1 | 4/2011 | Sull et al. |
| 2011/0179449 A1 | 7/2011 | Ganesan et al. |

OTHER PUBLICATIONS

U.S. Appl. No. 11/404,972, filed Apr. 13, 2006, Ganesan.
U.S. Appl. No. 11/515,267, filed Sep. 1, 2006, Ganesan.
U.S. Appl. No. 11/927,690, filed Oct. 30, 2007, Ganesan et al.
Video-on-Demand Research, printable at http:llwww.cs. ndsu. nodak.edu/-rvetterIATM/html/video. html.
C. Siva Ram Murthy "A Primary-Segmented Backup Scheme for Fast Restoration of Real-Time Channels from Network Component Failures", printable at http://www.prl.ernet.in/-librarv/Hari%200m/Hari%200m%20Lecture/Siva%20Ram%20Murthy final.html.
Clifford A. Shaffer, A Practical Introduction to Data Structures and Algorithm Analysis Java Edition, 1998, 11 pgs.
Decision on Petition to Make Special dated Nov. 29, 2005 in U.S. Appl. No. 11/075,573, 1 pg.
Decision on Petition to Make Special dated Dec. 18, 2007 in U.S. Appl. No. 11/974,138, 2 pgs.
Decision on Petition to Make Special dated Apr. 16, 2005 in U.S. Appl. No. 11/077,411, 1 pg.
Final Office Action dated Mar. 18, 2008 in U.S. Appl. No. 11/075,573, 18 pgs.
Final Office Action dated Apr. 24, 2006 in U.S. Appl. No. 11/077,411, 7 pgs.
Final Office Action dated Dec. 3, 2008 in U.S. Appl. No. 11/458,384, 24 pgs.
Final Office Action dated Dec. 29, 2008 in U.S. Appl. No. 11/210,272, 19 pgs.
International Preliminary Report on Patentability andSearching Authority in the International Application PCT/US2006/007070, World IntellectualProperty Organization, European Patent Office, Sep. 12, 2007,7 pages Written Opinion of the International.
International Preliminary Report on Patentability and Written Opinion in the International Application PCT/US2005/020051, World Intellectual Property Organization, European Patent Office, Apr. 3, 2007, 4 pages.
International Search Report and Written Opinion of the International Searching Authority inInternational Application PCT/US2006/007070, European Patent Office, Apr. 19,2007, 9 pages.
International Search Report and Written Opinion of the International Searching Authority inInternational Application PCT/US2006/007070, European Patent Office, Feb. 27, 2006, 12 pages.
International Search Report and Written Opinion of the International Searching Authority inInternational Application PCT/US2008/071735, European Patent Office, Feb. 19, 2009, 11 pages.
International Search Report International Searching Authority inInternational Application PCT/US2005/020051, European Patent Office, Mar. 9, 2007, 3 pages.
Jim Ferrara, Creating and Maintaining a Hierarchical Directory, Nov. 2002, 14 pgs.
Lisa Payne, Web Authoring Inline Images, Jan. 2002, 4 pgs.
Non-Final Office Action dated Jun. 30, 2008 in U.S. Appl. No. 11/075,573, 19 pgs.
Non-Final Office Action dated May 13, 2009 in U.S. Appl. No. 11/685,101, 10 pgs.
Non-Final Office Action dated Sep. 23, 2008 in U.S. Appl. No. 11/684,637, 5 pgs.
Non-Final Office Action dated Apr. 28, 2009 in U.S. Appl. No. 11/515,267, 9 pgs.
Non-Final Office Action dated Mar. 11, 2009 in U.S. Appl. No. 11/492,673, 12 pgs.
Non-Final Office Action dated Aug. 28, 2006 in U.S. Appl. No. 11/077,411, 10 pgs.
Non-Final Office Action dated Jan. 30, 2006 in U.S. Appl. No. 11/077,411, 6 pgs.
Non-Final Office Action dated Jun. 20, 2008 in U.S. Appl. No. 11/210,272, 16 pgs.
Non-Final Office Action dated Apr. 29, 2008 in U.S. Appl. No. 11/458,384, 24 pgs.
Non-Final Office Action dated Dec. 26, 2008 in U.S. Appl. No. 11/150,653, 26 pgs.
Non-Final Office Action dated Nov. 25, 2008 in U.S. Appl. No. 11/075,573, 18 pgs.
Non-Final Office Action dated Oct. 28, 2008 in U.S. Appl. No. 10/867,155, 12 pgs.
Non-Final Office Action dated Oct. 17, 2007 in U.S. Appl. No. 11/075,573, 13 pgs.
Non-Final Office Action dated Sep. 10, 2008 in U.S. Appl. No. 11/515,267, 9 pgs.
Notice of Allowance dated Jan. 16, 2007 in U.S. Appl. No. 11/077,411, 4 pgs.
Paris et al.: "Zero-delay broadcasting protocols for video-on-demand", ACM Multimedia, Proceedings of the International Conference, New York, NY, US, Oct. 30, 1999, 9 pages.
Petition to Make Special dated Oct. 31, 2005 in U.S. Appl. No. 11/075,573, 16 pgs.
Petition to Make Special dated Mar. 9, 2005 in U.S. Appl. No. 11/077,411, 52 pgs.
Petition to Make Special dated Oct. 10, 2007 in U.S. Appl. No. 11/974,138, 9 pgs.
Video-on-Demand Research, from http://www.cs. ndsu.nodak.edu/-rvetterIATM/html/video.html, dated Oct. 31, 2005, North Dakota State University, Computer Science Department, 2 pgs., Oct. 31, 2005.
C. Siva Ram Murthy "A Primary-Segmented Backup Scheme for Fast Restoration of Real-Time Channels from Network Component Failures", from http://www.prl.ernet.in/-librarv/Hari%200m/Hari%200m%20Lecture/Siva%20Ram%20Murthy final.html, dated Oct. 31, 2005, Indian Institute of Technology, Department ofComputer Science and Engineering, 8 pgs, Oct. 31, 2005.
Election/Restriction Requirement dated Oct. 28, 2009 in U.S. Appl. No. 11/404,972, 6 pgs.
Final Office Action dated Aug. 31, 2009 in U.S. Appl. No. 11/492,673, 16 pgs.

(56) References Cited

OTHER PUBLICATIONS

Final Office Action date Aug. 4, 2009 in U.S. Appl. No. 11/076,214, 15pages.
Final Office Action dated Jan. 21, 2010 in U.S. Appl. No. 11/515,267, 11 pgs.
Final Office Action dated Aug. 14, 2009 in U.S. Appl. No. 11/150,653, 27 pgs.
Final Office Action dated Sep. 30, 2009 in U.S. Appl. No. 11/269,462, 27 pgs.
Francois, Alexandre R.J., "A Hybrid Architectural Style for Distributed Parallel Processing of Generic Data Streams" May 2004, IEEE Computer Society, ICSE '04: Proceedings of the 26th International Conference on Software Engineering, pp. 1-10.
Guo, Yang et al., "P2Cast: Peer-to-peer Patching Scheme for VoD Service" May 2003, ACM, WWW '03: Proceedings of the 12th international conference on World Wide Web, pp. 301-309.
Non-Final Office Action dated Jul. 2, 2009 in U.S. Appl. No. 11/331,113, 10 pgs.
Non-Final Office Action dated Jun. 11, 2009 in U.S. Appl. No. 11/210,272, 23 pgs.
Non-Final Office Action dated Dec. 1, 2009 in U.S. Appl. No. 11/831,938, 16 pgs.
Non-Final Office Action dated Dec. 16, 2009 in U.S. Appl. No. 11/684,637, 5 pgs.
Non-Final Office Action date Dec. 23, 2008 in U.S. Appl. No. 11/076,214,19pages.
Non-Final Office Action dated Jul. 20, 2009 in U.S. Appl. No. 11/930,147, 14 pgs.
Notice of Allowance dated Nov. 2, 2009 in U.S. Appl. No. 11/685,101, 6 pgs.
Notice of Allowance dated Aug. 27, 2009 in U.S. Appl. No. 11/684,637, 3 pgs.
Final Office Action dated Aug. 30, 2011 in U.S. Appl. No. 11/492,673.
Non-Final Office Action dated Sep. 22, 2011 in U.S. Appl. No. 11/515,267.
Notice of Allowance mailed Sep. 13, 2011 in U.S. Appl. No. 11/150,653.
U.S. Appl. No. 60/646,080 Specification, Panwar, 709/231, Jan. 2005.
Communication of Dec. 16, 2010 in European Application No. 08796939.0-1244.
Final Office Action dated Sep. 28, 2010 in U.S. Appl. No. 11/492,673, 12 pages.
Final Office Action Mar. 18, 2010 in U.S. Appl. No. 11/331,113 15pages.
Final Office Action date Mar. 26, 2010 in U.S. Appl. No. 11/930,147, 13 pages.
Final Office Action date May 5, 2010 in U.S. Appl. No. 11/269,462, 10 pages.
Final Office Action date Jan. 21, 2010 in U.S. Appl. No. 11/075,573,24pages.
Final Office Action dated Sep. 17, 2010 in U.S. Appl. No. 11/150,653; 31 pages.
Final Office Action dated Oct. 14, 2010 in U.S. Appl. No. 11/076,214, 12 pages.
Final Office Action dated Jul. 22, 2011 in U.S. Appl. No. 11/075,573.
Final Office Action dated Feb. 10, 2011 in U.S. Appl. No. 11/515,267, 12 pages.
Final Office Action date Aug. 31, 2010 in U.S. Appl. No. 11/831,938; 29 pages.
International Preliminary Report on Patentability of Feb. 11, 2010 in International Application PCT/US2008/071735.
Ma et al., "Reducing bandwidth requirement for delivering video over wide area networks with proxy server", IEEE, 2002, vol. 4, Iss. 4, p. 539-550.
Non-Final Office Action date Apr. 12, 2010 in U.S. Appl. No. 11/492,673, 11 pages.
Non-Final Office Action Mar. 12, 2010 in U.S. Appl. No. 11/150,653 29pages.
Non-Final Office Action date Mar. 4, 2010 in U.S. Appl. No. 11/076,214, 13 pages.
Non-Final Office Action dated Jul. 8, 2011 in U.S. Appl. No. 11/831,938.
Non-Final Office Action date Mar. 24, 2010 in U.S. Appl. No. 11/404,972, 10 pages.
Non-Final Office Action date Aug. 2, 2010 in U.S. Appl. No. 11/515,267; 14 pages.
Non-Final Office Action dated Mar. 14, 2011 in U.S. Appl. No. 11/492,673, 15 pages.
Non-Final Office Action dated Mar. 14, 2011 in U.S. Appl. No. 11/150,653.
Non-Final Office Action dated Feb. 25, 2011 in U.S. Appl. No. 11,075,573, 27 pages.
Notice of Allowance dated Jun. 10, 2010 in U.S. Appl. No. 11/684,637; 8 pages.
Ramesh et al., "Multicast with cache (Mcache): an adaptive zero-delay video-on-demand service", IEEE, 2001. vol. 11, Iss. 3; p. 440-456.

\* cited by examiner

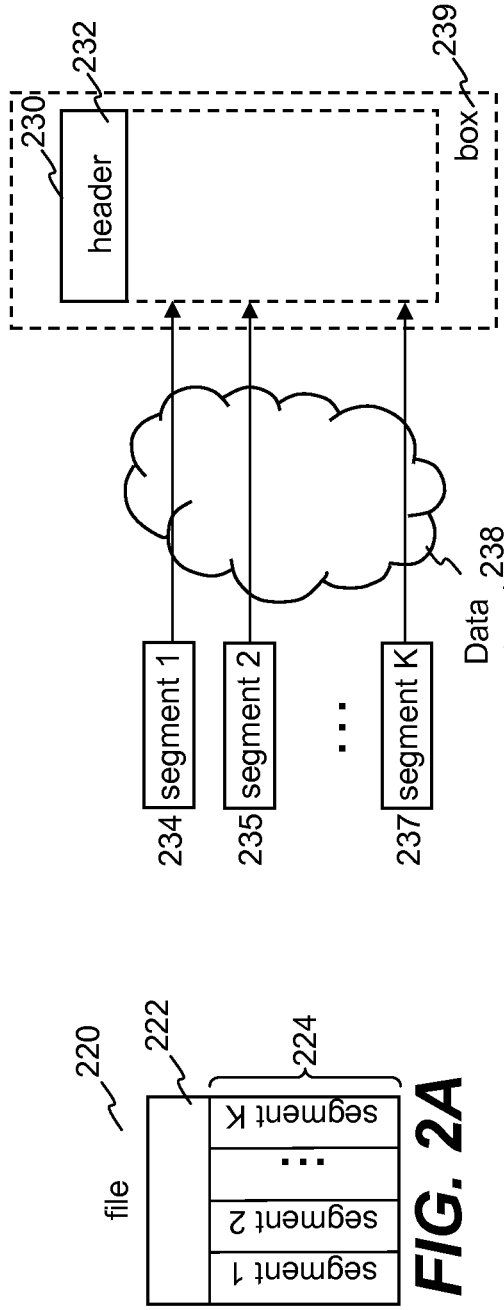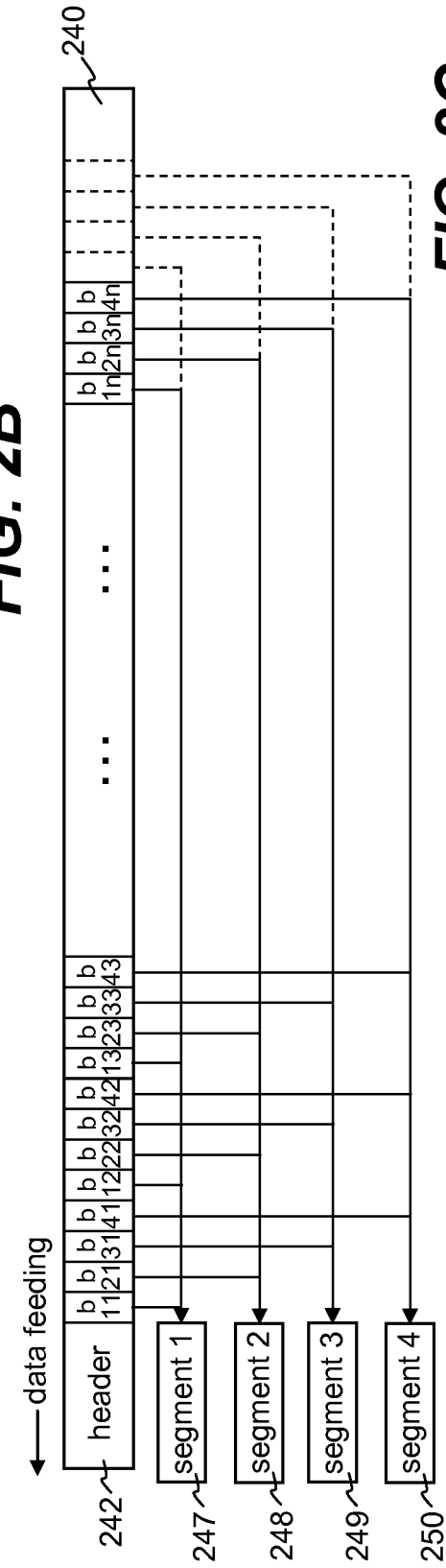

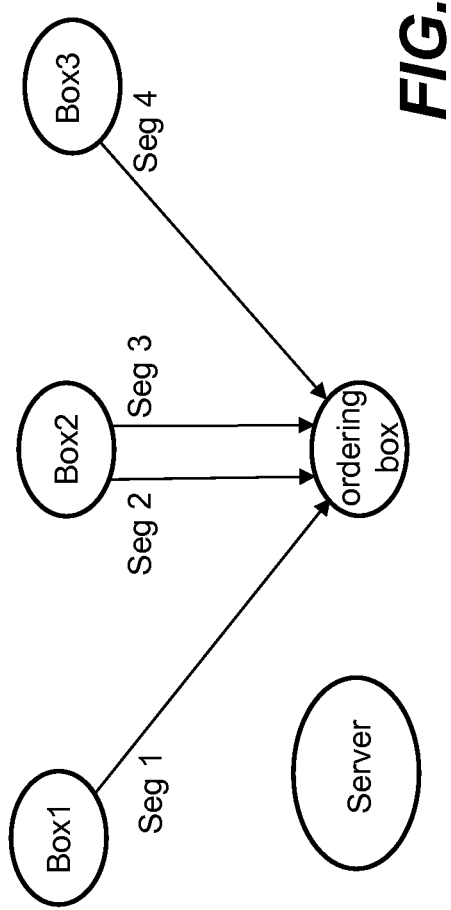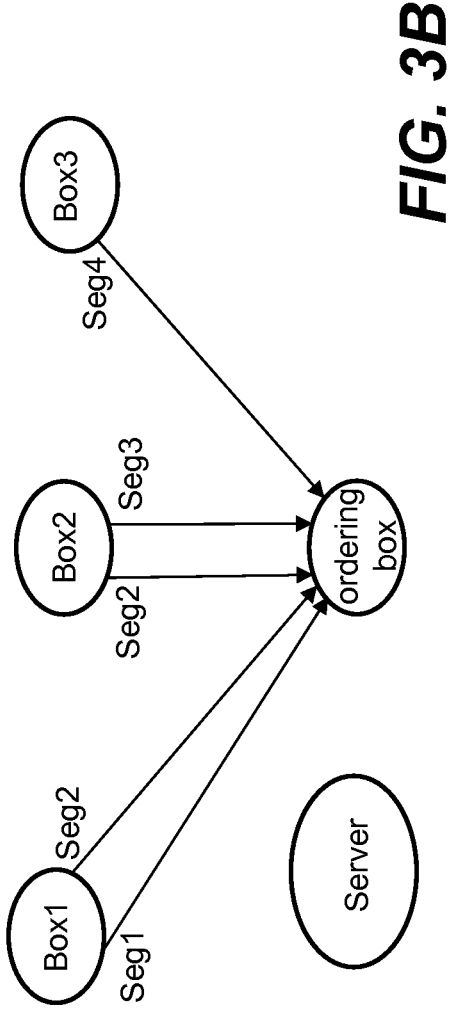

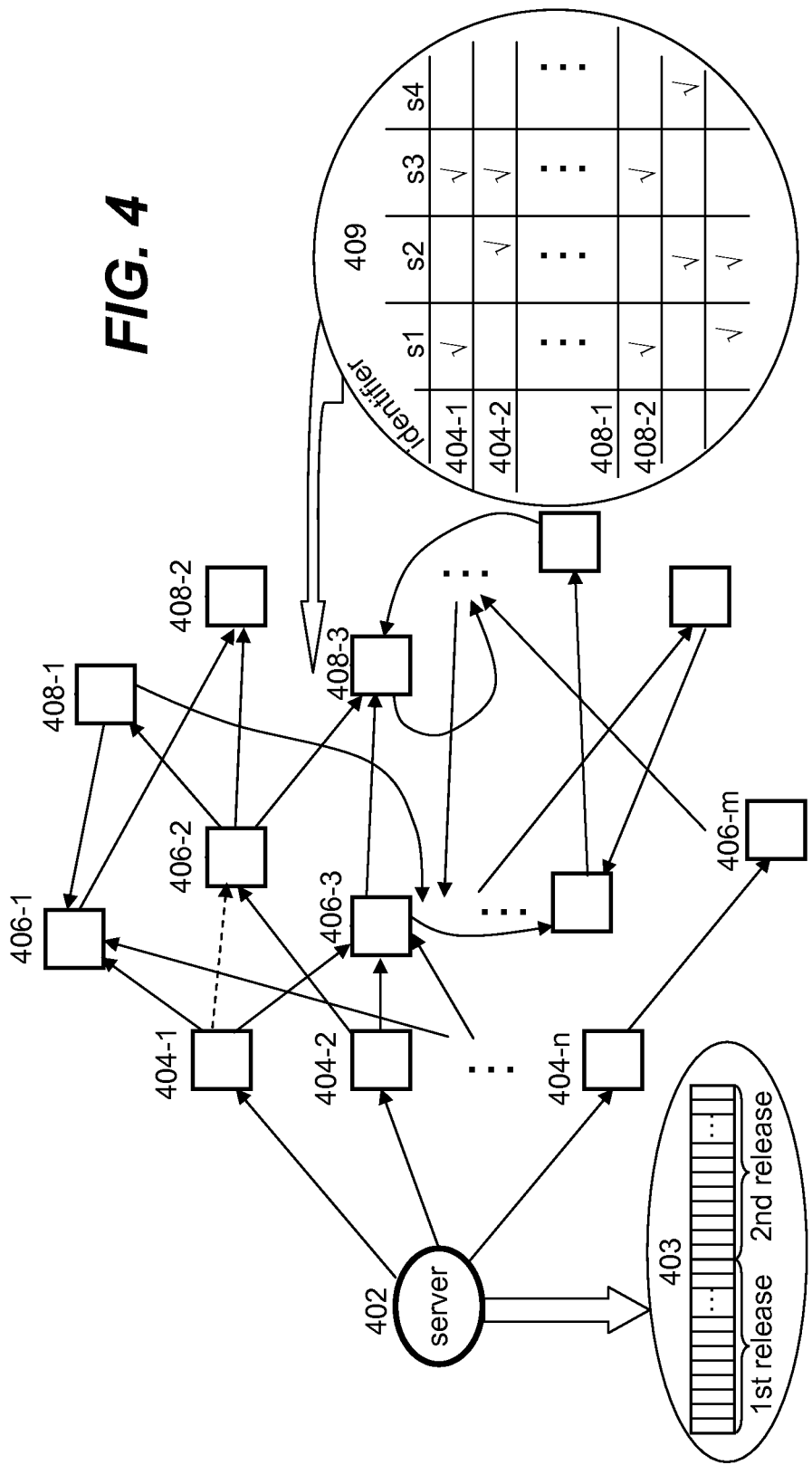

METHOD AND APPARATUS FOR SHARING MEDIA FILES AMONG NETWORK NODES

CROSS-REFERENCE TO RELATED APPLICATION

This is a continuation-in-part of co-pending U.S. application Ser. No. 11/075,573, entitled "Continuous data feeding in a distributed environment" and filed Mar. 9, 2005, and by at least one of the co-inventors herein.

BACKGROUND

1. Technical Field

The present invention is generally related to multimedia data delivery over the Internet. Particularly, the present invention is related to techniques for sharing media files among network nodes.

2. Description of the Related Art

It is common to share files among computing devices across a network. However, when data to be shared is of huge size and the network bandwidth between two devices sharing the data is limited, the utility or application of the data could suffer. For example, one device is supplying data pertaining to a movie to another device over a network with a limited bandwidth. If the data does not arrive at a required transmission rate, the playback of the movie at the receiving device could demonstrate annoying jittery effects.

One possible solution to resolve jittery effects is to design a lower transmission rate. However, there are applications that require a minimum transmission rate, otherwise the applications could not perform or be conducted as expected.

There, thus, is a great need for techniques that maximize the use of available bandwidths whiling sharing data among computing devices across one or more networks.

SUMMARY

This section is for the purpose of summarizing some aspects of embodiments of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Broadly speaking, the invention is related to techniques for sharing data among a plurality of networked devices, also referred to network nodes. To best use an available uploading bandwidth of a device sharing data with a receiving device, a portion of the data is uploaded within the available uploading bandwidth, and another portion of the data is uploaded from another device locally caching the same data. To satisfy the minimum transmission rate of the data to the receiving device, both portions of the data are concurrently uploaded from the two devices to the receiving device.

In reference to a predetermined minimum uploading bandwidth and the available uploading bandwidth, the two portions of data are interleaved and must be reassembled to recover the data for consumption in the receiving device. A size of the first portion of the data is determined by a server in view of the available uploading bandwidth a designated supplying box has.

According to one aspect, a media-on-demand system is provided. Significantly different from the prior art systems in which media services are rendered at a central server or servers, the present invention utilizes individual devices on a network to supply each other with needed sources in pieces to render required services. As a result, the loading pressure on a server is distributed into the network.

The invention may be implemented in numerous ways, including a method, system, device, or a computer readable medium. Several embodiments of the invention are discussed below. In one embodiment, the present invention is a method for sharing a file, the method comprises dividing at least some of the file into a sequence of data blocks, forming k segments, each of the k segments including some of the data blocks, wherein k is a finite integer greater than 1 and determined in accordance with a predefined minimum uploading bandwidth, causing at least a first device and a second device to locally cache at least one of the k segments; and designating the first device to supply a first portion of the one of the k segments and the second device to supply a second portion of the one of the k segments to a third device at substantially similar time, wherein the first and second portions are interleaved and multiplexed to reassemble the one of the k segments in the third device. In general, the file is a collection of data together with auxiliary data, if there is such auxiliary data. The designating of the first device to supply the first portion of the one of the k segments and the second device to supply the second portion of the one of the k segments to the third device happens when an uploading bandwidth of either one of the first and second devices is below the predefined minimum uploading bandwidth.

According to another embodiment, the present invention is a method for sharing a file, the method comprises dividing a file pertaining to a title into a sequence of data chunks, wherein the title is included in a release to update the library in each of boxes in service; designating an initial set of seeding boxes to receive the data chunks collectively, each of the seeding boxes receiving at least some of the data chunks; and causing each of the seeding boxes to propagate at least some or all of the received data chunks to a set of the boxes, wherein one of the boxes receives one of the data chunks from a first one and a second one of the seeding boxes concurrently, and data from the first one and the second one is interleaved and multiplexed to recover the one of the data chunks.

According to yet another embodiment, the present invention is a system for sharing a file, the system comprises at least a first device and a second device, each locally caching a data segment, an ordering device configured to receive the data segment; and a server configured to designate the first device to upload a first portion of the data segment to the ordering device, and the second device to upload a second portion of the data segment to the ordering device in accordance with respective uploading bandwidths for the first and second devices, wherein the first and second portions are interleaved determine. The data from the first and second portions must be multiplexed to recover the data segment in the ordering device.

Accordingly one of the objects of the present inventions is to provide techniques for sharing data or a file among a number of network nodes.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 2A, according to one embodiment, shows a file organized or fragmented into a header and K segments;

FIG. 2B shows a file pertaining to a title comprising one header and k segments, assuming a situation in which a box locally stores the header and receives the k segments from no more than k boxes to continue a playback of the title;

FIG. 2C shows a data stream representing a file, a beginning portion of which being allocated as a header and a remaining portion being decimated into four individual segments (k=4);

FIG. 3A shows that three boxes, box1, box2 and box3, are designated to supply four segments to an ordering box;

FIG. 3B shows a configuration in which box1 and box2 each have a bandwidth greater than the minimum uploading bandwidth (perhaps less than twice the minimum uploading bandwidth) so that box1 and box2 are concurrently uploading a common segment;

FIG. 4 shows a diagram of updating a library of all boxes in service using what is referred to as gossip protocol;

DETAILED DESCRIPTION OF THE INVENTION

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

Embodiments of the present invention are discussed herein with reference to FIGS. 1-8. However, those skilled in the art will readily appreciate that the detailed description given herein with respect to these figures is for explanatory purposes only as the invention extends beyond these limited embodiments.

Figure 1:
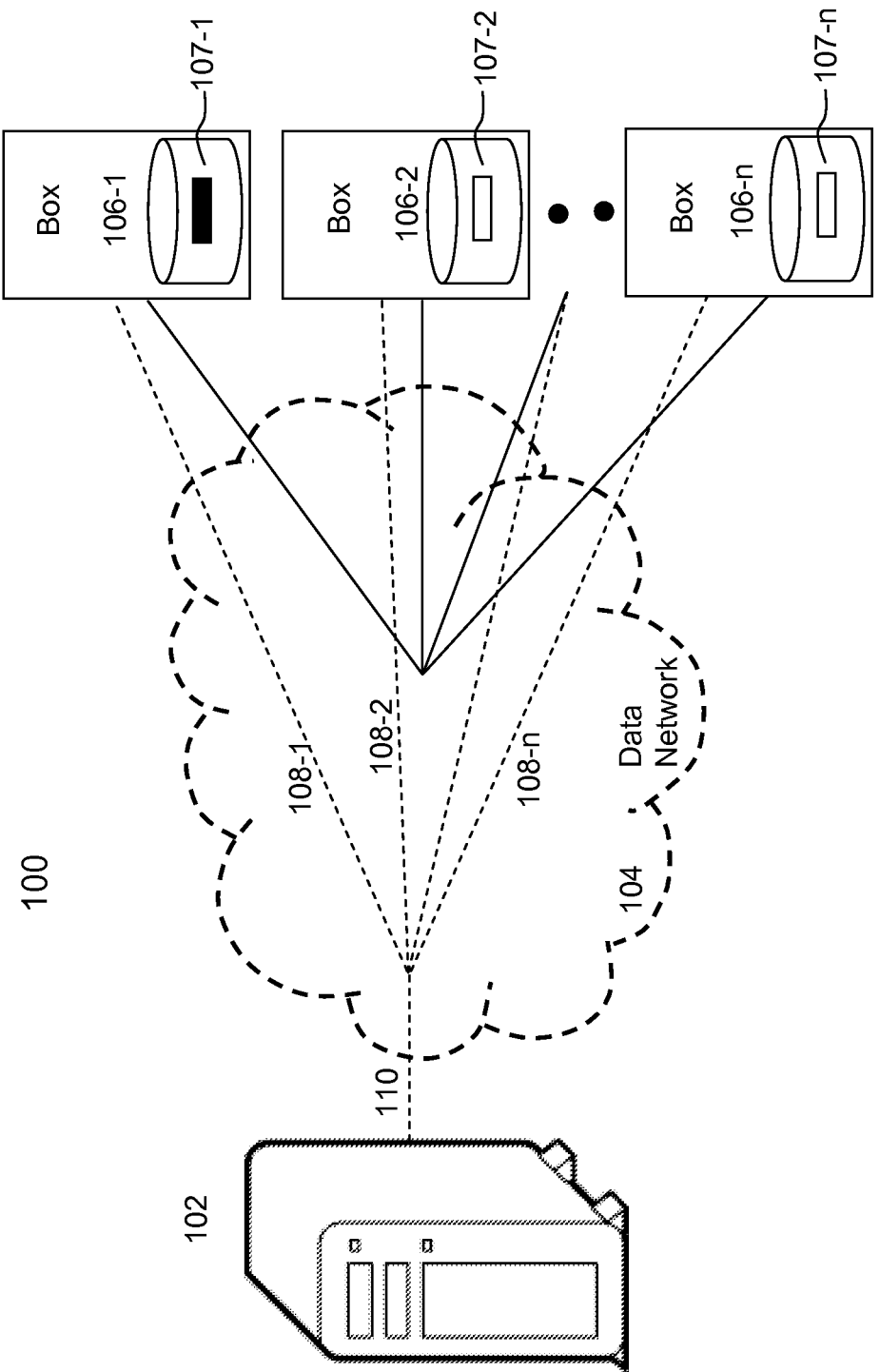
FIG. 1 shows a video delivery system based on a distributed network system, in accordance with one embodiment of the present invention.

FIG. 1 shows an exemplary configuration 100 of a distributed network system 100, in which the present invention may be practiced. It will be appreciated that the entire network may comprise a number of such network systems 100, for example, one for each box of a particular type, size, content, and etc.

A server 102, presumably managed and/or populated by a service provider, is configured to handle the delivery of video (or multimedia) services to users via local machines or boxes 106-1, 106-2, . . . 106-n. Different from a prior art video delivery system that delivers video data to a subscriber upon receiving a request therefrom, the server 102 is not responsible for delivering the content in response to a request from a user, and instead is configured to provide source information as to where and how to retrieve at least some of the content from other client machines, also referred to as boxes. The server 202 does not need a huge media storage device to provide the content. Instead, some of the boxes 106-1, 106-2, . . . 106-n are respectively configured to supply part or all of the content to each other.

According to one embodiment, when fulfilling a request from a local machine or a box (e.g., 106-1), communication between the server 102 and the box 106-1 over the network paths 108-1 and 110 may be limited to small-scale requests and responses (e.g., of small size and very short). A server response to a request from a box may include source information (e.g., identifiers), authorization information and security information. Using the response from the server 102, the box may be activated to begin playback of a title (e.g., 107-1). Substantially at the same time, the box may initiate one or more requests to other boxes (e.g., 106-2 and 106-n) in accordance with the source identifiers to request subsequent portions of the title (e.g., 107-2 and 107-n). Assuming proper authorization, the requesting box receives the subsequent portions of the data concurrently from the other boxes. Because of box-to-box communication of content, the bandwidth requirement for box-to-server communications over the network paths 108-1 and 110 is kept low and typically short in duration. In the event there are a large number of user boxes issuing playback requests substantially at the same time, the bandwidth of the backbone path 110 should be sufficient to avoid noticeable or burdensome delay.

The contents available in a library offered in any of the boxes 106-1, 106-2, . . . 106-n are originally provided by one or more content providers. Examples of the content providers include satellite receivers, television relay stations, analog or digital broadcasting station, movie studios and Internet sites. Depending on implementation, the contents may be initially received or originated in the server 102. Instead of maintaining and managing the content in a large storage device, the server 102 is configured to distribute the content or files to a plurality of local machines registered with the server 102. The boxes 106-1, 106-2, . . . 106-n shown in FIG. 1 are examples of local machines in service. Unless there is a need for a backup copy, the server 102 at any time has no need to keep a copy of the content. On the other hand, unless there is a special need to keep a complete copy of an extremely high-demand title in a box, none of the boxes in service has a complete copy of a title until an order is placed.

For convenience, it is assumed herein that a file pertaining to a title is played back when the title is selected and ordered by a user. When an order for a title is placed, a corresponding file must start to be available for playback. According to one embodiment, where a file is 840 Mbytes on average and a box includes a storage capacity of 300 Gbytes, a system may offer a large library of titles (e.g., 5000) for access at any time instantly. In the prior art, if the files for the titles must be stored in advance to offer instantaneous playback, the local storage of a box would have to have a capacity of 4,000 Gbytes, consequently, rendering VOD economically impractical.

According to one embodiment of the present invention, only one or more tail segments of a file are locally cached in a box. In some case, the locally cached may also include a beginning portion (referred to as a "header") for instant access. Such locally cached segments are referred to as residing objects or segments, while segments not residing locally are referred to as distributed objects or segments. If a beginning portion is locally cached, when a title is selected, the locally cached beginning portion or the header of the corresponding file is instantly played back. During the time the header is being played, the distributed segments corresponding to the title are retrieved simultaneously from other designated boxes. When the header is finished, the received parts of the distributed segments being streamed in from other boxes is combined with the residing segments for the title, if any, to enable the continuous playback of the title.

Depending on the popularity and concurrent demand for a particular title, the number of residing segments may be increased or decreased to control the dependency of each box on other boxes for playback. Typically, the more residing segments for a title a box has, the more distributed copies of the title there are in the entire system and thus the less dependency of the ordering box on the other boxes.

For example, in FIG. 1, when a user selects a title for playback from a box 106-1, a header 107-1 of the corresponding file residing in the box 106-1 is instantly accessed (provided that the user has been authenticated and/or payment is settled). In this example, there may be four segments for the video file, two of which are distributed in other boxes (e.g., 106-2 and 106-n). During the playback of the header, two distributed segments are streamed in from the other two boxes and locally buffered with the resident segments as continuing content. When the header is done, the continuing content is played back. As a result, instantaneous VOD may be realized.

Referring back to FIG. 2A, as an example, a file 220 is being organized or fragmented in terms of a header portion 222 and a tail portion comprising four segments 224. In general, the file 220 may be divided into any number of header and segment portions in consideration of a required transmission rate (e.g., related to the encoding and decoding rates for successful playback), and the minimum uploading and downloading capabilities of a network. According to one embodiment, given a required transmission rate (e.g., 1 megabit per second or 1 Mbps), the minimum uploading and downloading speeds of a network are considered to determine a number that defines the segmentation, and thus the dependency on other boxes and the support for concurrent demands of a particular title. It is assumed that a minimum uploading speed is U and a required transmission rate is D, and $D/U=K<k$, where k is the smallest integer greater than K. In one embodiment, a file is preferably divided into a header and k segments to optimally utilize the uploading speed of U, assuming that the downloading speed is at least k times faster than the uploading speed. For example, in a POTS-based DSL network for residential areas, the required transmission is about 1.0 Mbps while the uploading speed is about 320 kbps. Hence, k=4. In another embodiment, the number of segments is chosen to be some value k' larger than k such that the uploading rate corresponding to each of k' segments matches some pre-determined value.

As shown in FIG. 2B, a file 230 comprises one header 232 and K segments 234-237. FIG. 2B assumes a situation in which a local box stores a header 232 and depends on K other boxes to supply the K segments 234-237. It is assumed that the local box 239 has a downloading speed N times the uploading speed of the other boxes. While the header 232 or a time-fill program is being played back, the K segments can be downloaded concurrently across the network 238 as streaming into the local box 239 around the same time.

It should be noted that a time-fill program is preferably provided when a file pertaining to a title is fragmented without a header. The program may be played before an ordered movie is started. Similar to watching a movie in a movie theater, the time-fill program provides a number of previews of upcoming new releases. The time-fill program may be locally configured. In one embodiment, the time-fill program is used to stabilize data being fetched from one or more other boxes. In another embodiment, the time-fill program provides a platform for sponsors that hope to display their respective programs to audience. Orders or slot positions for these programs in a time-fill program may be auctioned.

As also shown in FIG. 2B, a header 232 is the beginning portion of a file while each segment is a decimated portion of the remainder of the file. In this embodiment, the data in the header is continuous, meaning the header itself can be played back (e.g., the first 15 minutes of the title), while the segment portions 234-237 must be present together before the tail portion of the file can be played. FIG. 2C shows a data stream 240 representing a file. As a special case, K=4, the beginning portion of the file 240 is allocated as a header 242 and the remaining portion is divided into four "vertical" segments 247-250. The segments 247-250 are created or formed by respectively sampling, in a decimated manner, the remaining portion of the file.

Depending on an exact data length of the remaining portion, the n-th data block in each of the segments 247-250 is four successive data blocks in the remaining portion of the file. In one embodiment, a data block comprises a chunk of data, for example, 256 Kbytes or 1 Mbyte. As shown in FIG. 2C, the remaining portion of the data stream 240 is expressed in data blocks as follows: b11, b21, b31, b41, b12, b22, b32, b42, b13, b23, b33, b43, . . . b1n, b2n, b3n, b4n. With the decimated sampling, the four segments 247-250 obtained from the remaining portion can be respectively expressed as follows:

Segment 1={b11, b12, b13, b14 . . . };
Segment 2={b21, b22, b23, b24 . . . }
Segment 3={b31, b32, b33, b34 . . . }; and
Segment 4={b41, b42, b43, b44 . . . }.

FIG. 2C shows one exemplary embodiment of fragmenting a file into a header 242 and four segments 247-250. There can be other ways to fragment a file. For example, besides fragmenting a file into several "vertical" segments representing a tail portion of a file, one or more segments may be allocated to represent audio portions of the file. Typically, a movie includes several audio tracks, each for a language (e.g., English, French or Spanish). As a result, all segments are not necessarily equal in length but need to be available at the same time to support playback. This particular example illustrates that not all segments for a title must be fetched to play back the title (e.g., all segments for the video data and only one segment for one selected audio track).

One of the features in the present invention is to best use the available uploading bandwidth. When an ordering box is requesting to fetching the distributed segments from other supplying boxes, these supplying boxes may be in the middle of a task or in an area that has an insufficient bandwidth. As a result, the supplying boxes may not be able to deliver what the ordering box has.

It is appreciated from the above description that each segment is formed in conjunction with a minimum uploading speed of a network. When a supplying box has an uploading bandwidth twice the minimum uploading bandwidth, the supplying box may be designed to supply two segments at the same time. Referring now to FIG. 3A, it shows that three boxes, box1, box2 and box3, are designated to supply four segments to an ordering box. Both box1 and box3 have a respective bandwidth equal to or greater than the minimum uploading bandwidth while box2 has a bandwidth twice the minimum uploading bandwidth. Accordingly, the server designates box2 to supply segments 2 and 3 at the same time while box1 and box2 supply segments 1 and 4, respectively. Logically, if a box has a bandwidth that may accommodate n segments, such a box may be designed to supply 1 to n segments at the same time to at least one ordering box.

Quite often, an uploading bandwidth of a supplying box may not have an uploading bandwidth exactly twice but greater than the minimum uploading bandwidth. According to another embodiment, such a bandwidth may be optimally used by uploading part of a segment. Referring to FIG. 3B, there shows a configuration in which box1 and box 2 each have a bandwidth greater than the minimum uploading bandwidth (perhaps less than twice the minimum uploading bandwidth). Accordingly, the server designates both box1 and box 2 to supply one complete segment and one partial segment. As shown in FIG. 3B, in addition to uploading Seg1, box1 is also at the same time uploading a portion of Seg2. Similar to box1, box2 is uploading another portion of Seg2 and at the same time uploading Seg3. Box3 is designed to upload only one segment Seg4. On the receiving side, the ordering box is receiving concurrently four segments Seg1, Seg2, Seg3 and Seg4.

According to one embodiment, If a supplying box has a (remaining) bandwidth less than a predefined minimum uploading bandwidth (e.g. 384 kbps), it can be configured to stream out only a portion of a segment, and another supplying box is designed to stream out the "left-over" portion. Specifically, if a segment needs to be streamed out at 384 kbps and a supplying box has only an available bandwidth of 256 kbps, thus supplying box transmits a portion of the segment at 256 kbps and another designated supplying box will be designed to transmit the remaining portion of the segment at 384−256=128 kbps. It can be appreciated that the another designated supplying box locally caches the segment and the two transmissions happen concurrently and must be interleaved for reconstruction in the receiver in order to enable a playback. For example, one can transmit every 2 out of 3 blocks in the segment for some fixed block size, e.g., 512 bytes, while another one transmits the remaining blocks.

One embodiment may enable a dynamically updated library with a large number of titles offered to users. Each of the titles may be selected and ordered for playback. Given a large library, for example, of 5000 titles that are updated periodically (e.g., daily) and can be accessed anytime, some of the titles may be more popular and thus demanded more often and by more users than others. To minimize possible bandwidth problems or unavailability of boxes for sourcing popular titles, the seeding of residing objects and distributed objects should be performed intelligently, e.g., according to popularity, geography, demographics, and/or like criteria.

Referring now to FIG. 4, there shows a diagram 400 of updating a library of all boxes in service. When a server (e.g., the server 102 of FIG. 1) updates the library, the library in all the boxes is updated accordingly. According to one embodiment, the updating process is carried out synchronously and/or asynchronously.

The server 402 is configured to prepare a file pertaining to the release of a title into segments or in addition to a header, if needed. For convenience, it is assumed that that file is segmented into K segments. As described above, these K segments are distributed into boxes in service. In principle, each of the boxes receives none or at least one but not all of the K segments. Accordingly, there may be a plurality of release packages in reference to what a box is supposed to receive. For example:

Release package 0=( ); meaning a box receives none of the segments;
Release package 1=(segment 1);
Release package 2=(segment 1, segment 2);
Release package 3=(segment 1, segment 2, segment 3);
...
Release package N=(segment 1, segment 2, . . . segment N);
Release package N+1=(segment 2);
Release package N+2=(segment 2, segment 3);
...

N is a positive integer and must be smaller than K for the invention to work efficiently. For example, K=4, though there may be 24 (4×3×2) release packages, only a fractional portion of the release packages will make the invention work efficiently. very large number of release packages.

In operation, each of the boxes in service is configured to receive one release package. Initially, the server prepares a release instruction including metadata about a release, a least popular title to be discarded from the library and/or title transfers. The instruction may describe which box gets which of the release packages and how the package is to be received (i.e., from which other boxes). For example, the instruction could specify that boxes identified by identifiers that demonstrate certain characteristics are to receive a release package X. There may be a default instruction that applies in general to all releases, and there may be instructions tailored to specific releases as well. One of the objectives of assigning release packages to boxes may be to distribute the packages fairly evenly among all boxes in service to ensure uniform distribution of different segments.

The release instruction, once prepared by the server, is propagated to boxes in service either via direct communication between the server and a box, or by box-to-box propagation of the instruction via a gossip protocol, which will be described in detail below. In any case, it is assumed that each box recognizes the need for it to receive a particular release package.

The release is transformed into a sequence of data chunks 403 representing segments for the release. A data chunk is an atomic unit of data transfer from the server to the boxes, or between two boxes. For example, each of the data chunks may be 1 Mbyte in size and uniquely identified. The sequence of data chunks 403 may represent two separate titles being propagated to the boxes to update the library. In general, each box desires a specific subset of the data chunks that make up a proper release package corresponding to that box. In addition, the release instruction itself may be represented as one or more data chunks that are to be propagated to all boxes.

In operation, the server 402 initiates respective communications with a set of boxes 404-1, 404-2, . . . 404-n and provides each of them with some of the data chunks required by that box. Preferably, each data chunk is seeded into at least one of the boxes by the server 402. The exact number of the boxes 404-1, 404-2, . . . 404-n initially to receive the data chunks does not constrain distribution. In one embodiment, the designation of the boxes 404-1, 404-2, . . . 404-n is fairly random. In another embodiment, the designation of the boxes 404-1, 404-2, . . . 404-n is based on one or more of a time zone, the geographical location, an available network bandwidth, and the latency thereof, the Internet service provider for the box, etc. In any case, whenever the server 402 is idle, the server 402 can always designate different boxes to receive data chunks.

Each of the boxes 404-1, 404-2, . . . 404-n is configured to spread data chunks to other boxes in service based on what is commonly referred to as a "gossip protocol," an applicationlayer multicast-like protocol. It should be noted that not all of the boxes 404-1, 404-2, . . . and 404-*n* have received identical data chunks. Any of the boxes 404-1, 404-2, . . . and 404-*n* may start to spread a data chunk to other boxes as soon as it has received a data chunk in its entirety. In operation, the box 404-1 is assigned to propagate at least some of its received data chunks to boxes 406-1, 406-2 and 406-3, communicating with one or more of these boxes simultaneously. The box 404-2 is assigned to propagate at least some of its received data chunks to boxes 406-2 and 406-3. The box 406-2 is configured to know exactly what data chunks to get from the box 404-1, the box 404-2, and any other boxes configured to feed it chunks of data. Further, the box 406-2 is assigned to propagate at least some of its received data chunks to boxes 408-1, 408-2 and 408-3. Note that the propagation of data is not necessarily hierarchical. For example, box 408-1 might send data chunks "backward" to 406-1, as seen in the figure.

In one embodiment, data chunks are propagated only to boxes that actually desire those particular chunks in order to avoid wasteful data transmission. Moreover, wasteful data transmissions may be avoided by ensuring that a data chunk is propagated to a box only if it does not already possess that chunk and is not in the process of downloading that chunk from elsewhere. The propagation of chunks may be through synchronous protocols where all boxes participate at the same time in a coordinated fashion, or asynchronous protocols in which each box may choose when to participate and for how long in a flexible manner. For example, a box could cease participating in the downloading and propagation of chunks whenever it is busy serving a movie for an ordering box, or when the network is detected to be in a period of intense usage. The box may continuously monitor the network conditions, and adaptively rejoin the gossiping propagation when there is sufficient bandwidth available.

In operation, if any one of the boxes, for whatever reason, fails to accept data chunks, the box could be dropped as a supplier or a substitute box could be configured to receive and supply the data chunk. The box that missed the release may fetch the data later from one or more updated boxes. By repeatedly and recursively propagating data chunks via boxes after boxes (i.e., by pulling or pushing synchronously and/or asynchronously), eventually all boxes in service will be populated with each release (the header and designated segments of all titles to be added and the identification of titles to be removed).

In seeding the releases in a box from multiple other boxes, a data chunk may not be necessarily from a single box. Depending on the available bandwidth, the data chunk may be from two other boxes. Similar to the operation as shown in FIG. 2E, the two other boxes may each send a portion of the data chunk due to the limited available uploading bandwidth.

After updating is finished, a map 409 identifying which box has which segments can be developed. By the map 409, whenever an order is received from an ordering box, the server can designate appropriate boxes to supply the non-locally cached segments to the ordering box. Alternatively, the map 409 enables a box to obtain source information to fetch needed segments to fulfill an order.

When the release is not for the mostly demanded category, the determination of which box to retain what segment(s) may be based on several factors such as geographic locations, time zone, viewing behaviors or a preferred language so as to maximize the efficiency of transporting the segments among the boxes when needed.

Figure 5A:
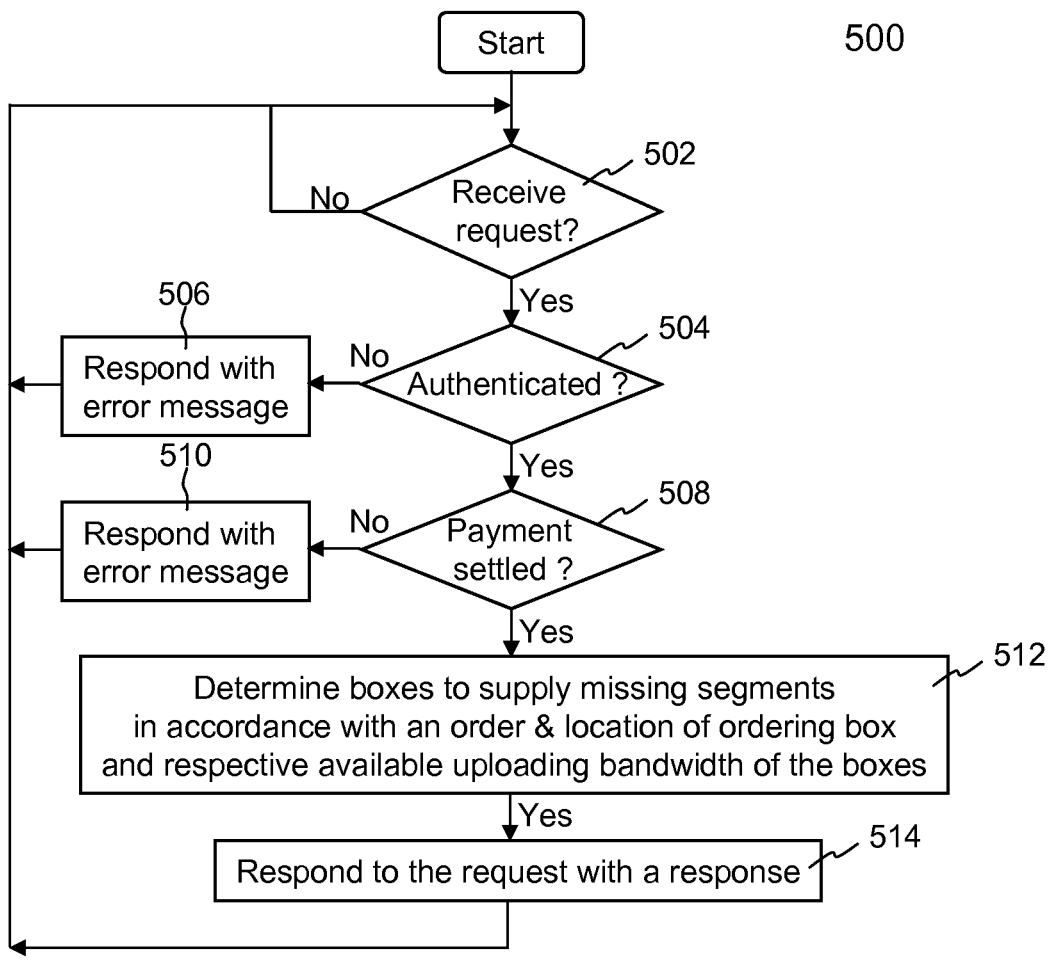
FIG. 5A shows a flowchart or process of starting a playback of a selection (i.e., a title) in a library.

Referring now to FIG. 5A, there shows a flowchart or process 500 of starting a playback of a selection (i.e., a title) in a library. The process 500 may be implemented in software, hardware or a combination of both as a method, a process, and/or a system. Preferably, the process 500 is executed in a computing device designated as a server facilitating the instant playback of a selected title from a box associated with a user. In one embodiment, the process 500 is employed in a media on demand system. At 502, the process 500 is awaiting a request from an ordering box associated with a user. Typically, a user selects a title and then places an order. As will be further described below, the ordering box generates a request to be transported to the server. The process 500 is activated when such request including the order is received from the ordering box. In general, the request includes an identifier and an IP address of the ordering box, the user account information (e.g., user name), and the order information. Before anything happens in the ordering box, the process 500 proceeds with authentication of the user. If the user is not registered, the process 500 goes from 504 to 506 wherein a response including an error message is generated and returned to the ordering box. Depending on implementation, the error message may activate a local module in the ordering box to display an error message or ask the user to register with the system.

After the user is authenticated, the process 500 goes to 508 to determine if payment for the order is settled. In one embodiment, in a registration process, a user may provide credit card information for charges on any order the user places with the system. In another embodiment, the user may receive a monthly statement for collective settlement of charges. If payment is not settled (e.g., the user has a large outstanding balance in his/her account), the process 500 goes to 510 where a response including an error message is generated and returned to the ordering box. The error message may be displayed locally to the user for payment.

After payment is settled, the process 500 goes to 512 to determine a number of boxes that are designated to supply the segments to the ordering box. According to one of the features in the present invention, after a number of candidate boxes are selected, their respective uploading bandwidths are considered. If a remaining uploading bandwidth for a box is less than what is needed for uploading a whole segment to an ordering box, depending on implementation, the server may be configured to look for another box with a sufficient uploading bandwidth or utilize what is available. It is assumed that the server is configured to use the remaining available uploading bandwidth. In operation, the remaining available uploading bandwidth has to exceed a threshold otherwise it would be meaningless to use such a supplying box.

Once the supplying box is determined to upload only a portion of a segment, another supplying box that locally caches the same segment is determined to complement the uploading of the segment. As a result, a segment may be supplied from two boxes. But in any case, the exact number of boxes depends on the number of segments the ordering box needs to continue the playback of the selected title. At 514, a response is generated in accordance with the received request. In general, the response includes source information, authentication information and security information. The source information instructs where and how the ordering box can get the needed segment(s) to continue the playback of the selected title. The authentication information allows the ordering box to conduct respective secured communications with boxes designated to supply the needed segment(s). The security information facilitates decryption of any data for the playback of the ordered title.

In determining one or more boxes to supply the needed segments among others, one or more several factors may be considered depending on implementation. These factors include, but may not be limited to, respective available bandwidths, geographic locations, histories of availability of these supplying boxes, and the Internet service provider of each box. In addition, whether the ordered title is popular or not, a supplying box is new or not, and a supplying box is busy or not may be considered as well. In any case, the response is transported back to the ordering box or causes the ordering box to start the playback while receiving the needed segments. The process 500 then returns to 502 to await another request.

Figure 5B:
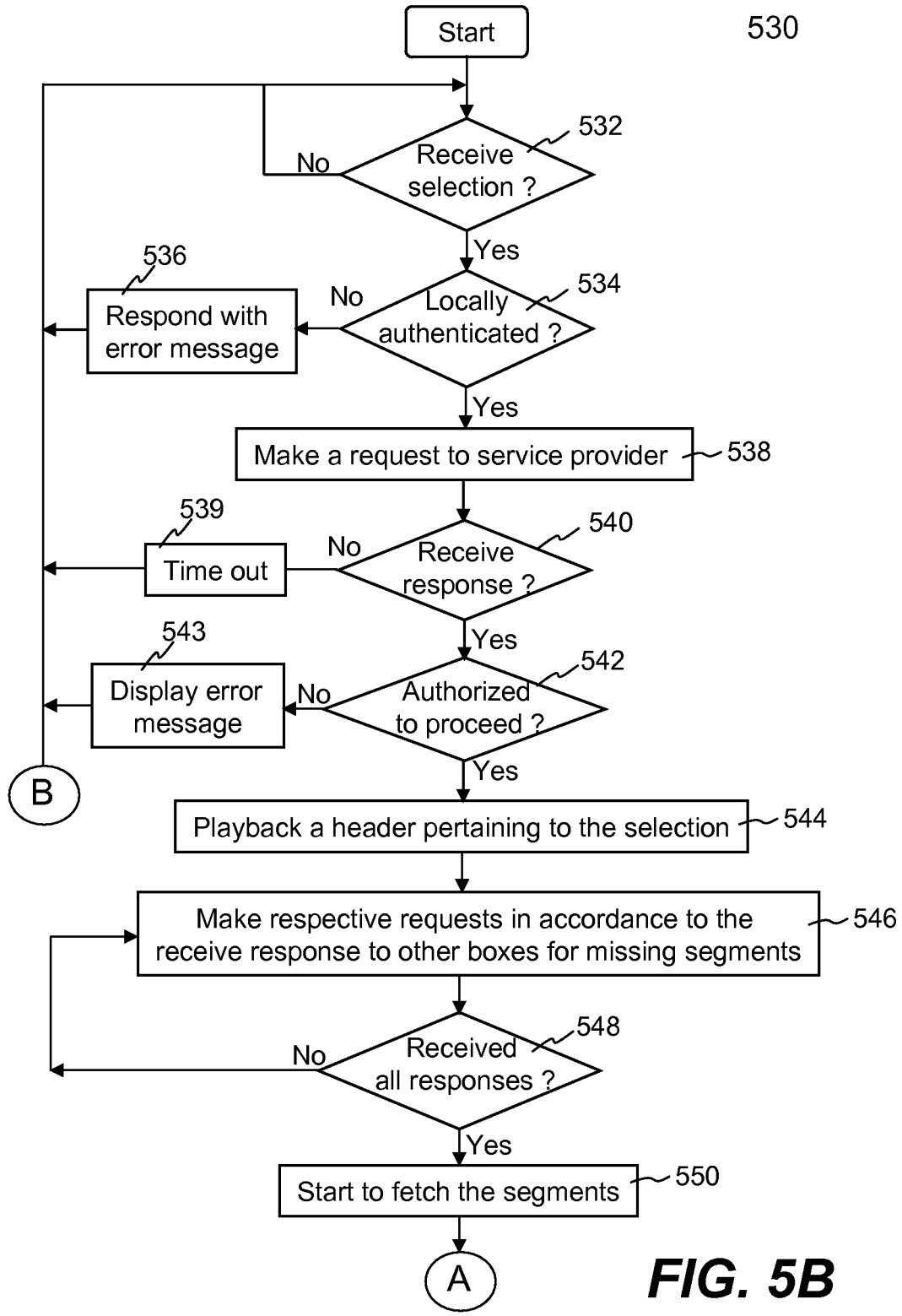
FIG. 5B and FIG. 5C collectively show a flowchart or process of starting a playback of a selection (e.g., a title).
Figure 5C:
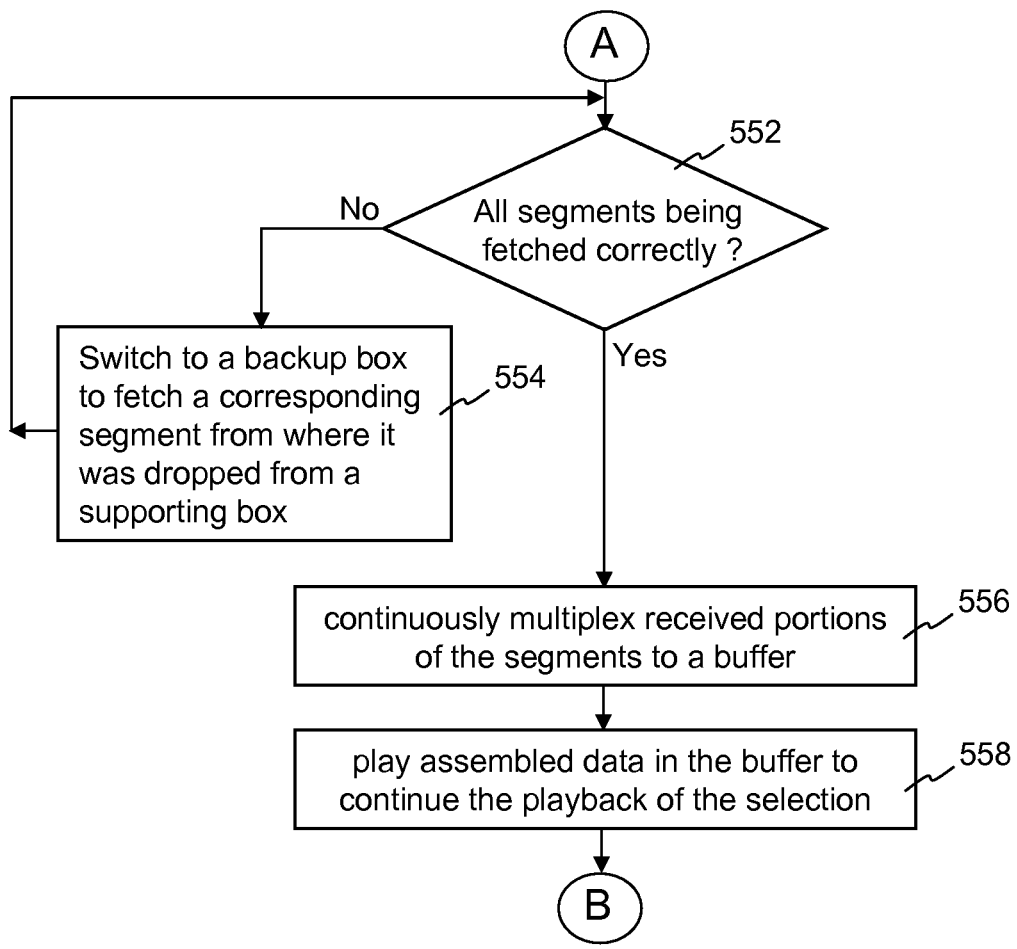

Referring now to FIG. 5B and FIG. 5C, both figures collectively show a flowchart or process 530 of starting a playback of a selection (i.e., a title). The process 530 may be implemented in software, hardware or a combination of both as a method, a process, and/or a system. Preferably, the process 530 is executed in a computing device that may correspond to a box as used herein.

At 532, the process 530 awaits a selection from a user. In one case, a user views a display with a plurality of titles from which the user may activate a key (e.g., on a remote control or keyboard) to choose one of the titles. The process 530 is activated when a selection is made by the user. The process 530 goes to 534 to determine whether the user and/or box is properly authenticated. In one embodiment, a registered user is required to input a username and a password for authentication. In another embodiment, a registered user is required to enter a code for authentication. There may be other ways to authenticate a user. In any case, the process 530 needs to ensure that a user and a box is legitimate. If not, the user is sent an error message at 536 that may recommend that the user register with the system.

After a registered user has been authenticated at 534, the box sends a request at 538 in accordance with the selection. The request includes information about the order and the user. The request is transported to the server by a service provider. Upon receiving the request, the server proceeds with process 500 of FIG. 5A. Meanwhile, the box awaits a response from the server at 540. The request may be re-sent if a response is not received within a predefined time (e.g., 5 seconds). However, if the response is not received beyond a certain time (e.g., the network is down), an error message will be displayed at 539.

At 542, the response is received from the server. For proper reason, the response may restrict the user from using the system. If the user is restricted, the process 530 goes to 543 to display an error message to the user. Upon authorization, the process 530 goes to 544 where a header of the file pertaining to the selected title is played and may be displayed via a display utility.

At 546, in accordance with the response from the server, the box makes respective requests to other boxes for missing segments. As described above, the response includes source information indicating where the box can fetch the missing segments. For example, if there are eight segments for a file and the box stores two of the segments locally, then six segments must be fetched from other boxes. In one embodiment, the six segments are provided from four other designated boxes as follows:

Box 1: {segment 1, ⅓ segment 2}
Box 2: {⅔ segment 2}
Box 3: {segment 4, segment 5, ½ segment 6}
Box 4: {½ segment 6} where the respective uploading bandwidths for the four designated boxes are best used without interrupting the uploading of the needed segments to the ordering box.

At 548, the box awaits a response from the boxes being requested to supply the missing segments. If one of the boxes is unable to respond to the request, a backup box may be called upon to supply the segment. If the backup box is also unable to respond to the request, the box will send a request to the server for additional backup boxes. In any case, after the designated boxes respond to the requests from the ordering box, the ordering box at 550 starts to fetch the missing segments from the designated and responded boxes.

As described above, the missing segments are expected to arrive at a predetermined speed. If, for some reason, a portion of the network is congested or the box itself is malfunctioning, causing a significant slowdown of the segment being fetched, the process 530 goes to 554 where a backup box is called in to continue supplying the segment being interrupted.

If all segments are streaming at predetermined minimum speeds, then, at 556, portions of the segments locally cached and the portions of the segments being streamed in are multiplexed into a buffer to continue the playback of the ordered title. If there is a segment being supplied from two boxes, the data streams from the two boxes are multiplexed to recover the original order of the segment before the data from the segment is joined to be multiplexed with that from other segments.

The process 530 goes to 558 to continue the playback of the assembled data in the buffer until the entire file for the ordered title is played. The process 530 then goes back to 532 to await another order from the user.

One skilled in the art will recognize that elements of the system may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier wave. The computer-readable media can also be distributed over network-coupled computer systems so that the computer-readable code is stored and executed in a distributed fashion.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. For example, in one embodiment, the size of a header for a file may be reduced to zero, in other words, a file is fragmented into a plurality of segments that can be distributed into boxes. Also, when an order of a title is placed, the server may identify the sources that will supply data for the order, and then contact these suppliers itself to initiate data transfers, instead of requiring the ordering box to initiate communication with the sources. In fact, an ordering box could even dynamically obtain the source information from boxes that cache respective segments for the title instead of requiring the server to identify the supplying boxes. Accordingly, the scope of the present invention is defined by the appended claims rather than the foregoing description of embodiments.

I claim:

1. A method for sharing a data file among a plurality of devices in a network, the method comprising:
partitioning at least a portion of the data file into a sequence of data blocks;
forming a number of segments, wherein each of the segments includes a plurality of the data blocks and wherein the number of segments is determined in accordance with a predefined minimum uploading bandwidth;

causing each of a first device and a second device, of the plurality of devices, to locally store at least a first segment of the number of segments;

configuring each of the first device and the second device to propagate, in response to determining that the network has a certain amount of bandwidth available, a set of locally stored segments, of the number of segments, wherein the first device and the second device propagates the set of locally stored segments to other devices, of the plurality of devices, which do not already store the set of locally stored segments; and configuring each of the first device and the second device to cease the propagation of locally stored segments whenever that device is instructed to serve a particular data file for playback for a user.

2. The method as recited in claim 1, further comprising:
determining an upload bandwidth associated with each of the first and second devices; and
configuring the first device and the second to transmit respective first and second portions of the first segment, concurrently, to a third device of the plurality of devices, wherein the first and second portions are (i) determined based, at least in part, on the upload bandwidths of the first and second devices, respectively, and (ii) interleaved and multiplexed to reassemble the first segment at the third device.

3. The method as recited in claim 2, wherein the upload bandwidth of at least one of the first or second device is below a predefined minimum uploading bandwidth.

4. The method as recited in claim 2, wherein a remaining upload bandwidth of the first device is below a predefined minimum uploading bandwidth.

5. The method as recited in claim 4, wherein the first device is further configured to transmit portions of a second segment, of the number of segments, to the third device.

6. The method as recited in claim 4, wherein the remaining upload bandwidth of the first device is a portion of the total upload bandwidth available to the first device.

7. The method as recited in claim 2, wherein a FIFO data buffer in the third device is configured to store the number of segments, and wherein the first and second portions of the first segment are concurrently received from the first and second devices, respectively, and reassembled prior to being provided to the FIFO data buffer.

8. A method for sharing a data file among a plurality of devices in a network, the method comprising:
partitioning at least a portion of the data file into a sequence of data blocks, wherein the data file pertains to a title that is included in a library and wherein the library is updated in each of the plurality of devices in the network;
configuring a first set of devices, of the plurality of devices, to receive the sequence of data blocks collectively, such that each device in the first set receives at least one of the data blocks;
configuring each of a first device and a second device of the first set of devices to propagate, in response to determining that the network has a certain amount of bandwidth available, a set of locally stored data blocks, of the sequence of data blocks, to other devices, of the plurality of devices, which do not already store the set of locally stored data blocks; and
configuring each of the first device and the second device to cease the propagation of locally stored data blocks whenever that device is instructed to serve a particular data file for playback for a user.

9. The method as recited in claim 8, further comprising:
determining an upload bandwidth associated with each device in the first set of devices;
causing the first device and the second device to transmit a respective first amount and a second amount of the locally stored data blocks, concurrently, to a third device of the plurality of devices;
wherein the first and second amounts of data blocks are (i) determined based, at least in part, on the upload bandwidths of the first and the second devices, respectively, and (ii) interleaved and multiplexed to reassemble the data file at the third device; and
if necessary, repeatedly transmitting some or all of the received data blocks to a second set of devices, of the plurality of devices, until each of the plurality of devices in the network has received a designated amount of the data blocks.

10. The method as recited in claim 9, further comprising:
determining a minimum uploading bandwidth associated with the network;
determining a required transmission rate for continuous playback of the title; and
determining the first and second amounts of the received data blocks based, at least in part, on (i) the minimum uploading bandwidth and (ii) the required transmission rate.

11. The method as recited in claim 8, wherein the data file includes auxiliary data, in addition to the sequence of data blocks.

12. The method as recited in claim 11, wherein the data file includes video data corresponding to one or more of (i) a movie, (ii) news footage, (iii) a commercial video, or (iv) a game.

13. A system for sharing a data file among a plurality of devices in a network, the system comprising:
a first device and a second device, of the plurality of devices, each locally storing at least a first data segment of a plurality of data segments pertaining to the data file, wherein each of the plurality of devices is configured to:
propagate, in response to determining that the network has a certain amount of bandwidth available, a set of locally stored segments, of the number of segments, to other devices, of the plurality of devices, which do not already store the set of locally stored segments; and
cease the propagation of locally stored segments whenever that device is instructed to serve a particular data file for playback for a user;
a third device, of the plurality of devices, configured to initiate a request for the first data segment; and
a server to receive the request from the third device and configure the first and second devices to transmit respective first and second portions of the first data segment, concurrently, to the third device.

14. The system as recited in claim 13, wherein the data file includes auxiliary data, in addition to the sequence of data blocks.

15. The system as recited in claim 13, wherein the server is configured to determine an upload bandwidth associated with each of the first and second devices, and wherein the upload bandwidth associated with the first device is below a predefined minimum uploading bandwidth.

16. The system as recited in claim 13, wherein the server is configured to determine an upload bandwidth associated with each of the first and second devices, and wherein a remaining upload bandwidth of the first device is below a predefined minimum uploading bandwidth.

17. The system as recited in claim 13, wherein the first data segment is one of a plurality of data segments pertaining to a title and wherein each of the plurality of data segments are available for transmission to the third device to support playback of the title.

18. The system as recited in claim 17, wherein a download bandwidth associated with the third device is greater than a predefined minimum uploading bandwidth.

19. The system as recited in claim 18, wherein the data file includes video data corresponding to one or more of (i) a movie, (ii) news footage, (iii) a commercial video, or (iv) a game.

\* \* \* \* \*